Aug. 20, 1957     O. WADE ET AL     2,803,732
HIGH-SPEED R. F. SEALING
Filed Jan. 17, 1952     2 Sheets-Sheet 2

INVENTOR
ORISON WADE
BY JOHN G. RAY
ATTORNEY

United States Patent Office 2,803,732
Patented Aug. 20, 1957

2,803,732

HIGH-SPEED R. F. SEALING

Orison Wade, San Diego, Calif., and John Gilbert Ray, Mineola, N. Y., assignors to Sylvania Electric Products Inc., a corporation of Massachusetts Application January 17, 1952, Serial No. 266,866

6 Claims. (Cl. 219—10.57)

The present invention relates generally to the construction of hermetically sealed and evacuated containers and more particularly to envelopes for electron devices and the exhausting and sealing of such envelopes.

In the art of sealing it is often desirable to complete an entire seal in the shortest possible instant of time. R. F. induction type heating has been employed to accomplish this purpose. When such method is used the materials being welded or brazed are locally heated to fusion temperature by the radio frequency energy. However, to obtain the maximum efficiency when sealing with this method it is necessary to maintain a minimum coupling distance between the R. F. work coil and the work being sealed. In maintaining such close coupling distances however, irregularities lead to mis-centering of the work and non-uniformity in the flux pattern of the concentrating coil are often accentuated to such a degree that non-uniform heating of the work may result. Since precision jigging which might aid in preventing this cannot always be maintained on production machinery this problem is a very real one.

An object of the present invention is the provision of a new method for high speed sealing and exhausting of a metal envelope for an electron device or a mercury switch.

Another object of the present invention is to provide a method for the high speed sealing of relatively small parts.

Still another object of this invention is to provide the technique developed for sealing parts with the aid of induction heating.

The foregoing objects and other advantages incidental to this application may be obtained by providing means for uniformly distributing the flux around the work surface during the application of the radio frequency energy. This may be accomplished in several ways. In accordance with one method the work is caused to rotate relative to the coil in such a way that each portion of the seal line is similarly exposed to each portion and relative position of the coil during the sealing time. A second method of accomplishing this result is to provide a high permeability, low loss material in the immediate area between the coil and the work at the place where the seal is to take place. This is done in order to obtain a more uniform distribution of the flux and a more efficient coupling than can be accomplished with an air path alone.

In the accompanying drawings which illustrate apparatus for carrying out the method of this invention;

Figure 1:
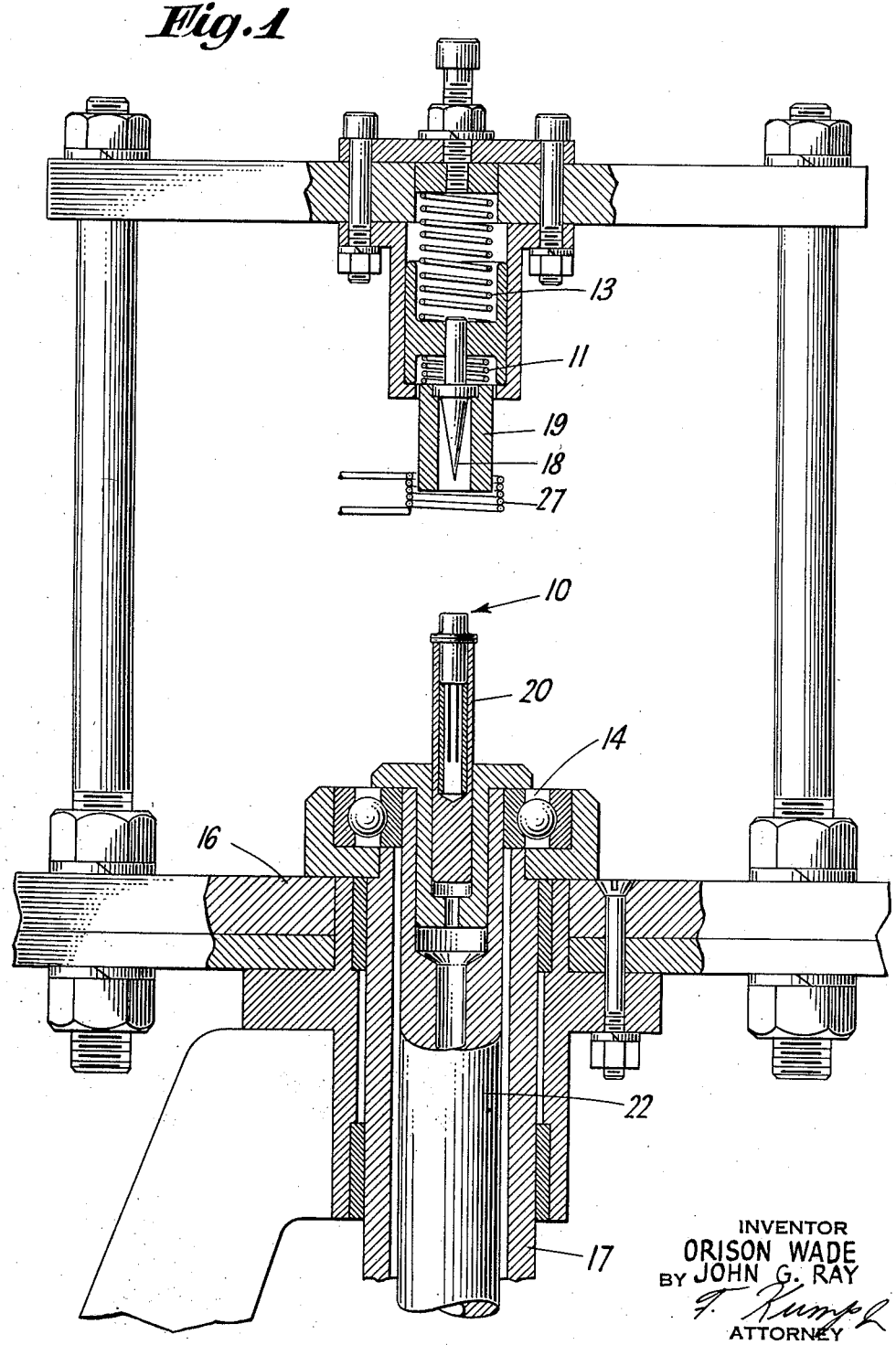
Figure 1 is a front elevation partly in section showing the jig in which the article to be sealed is held and the R. F. flash coil which is to do the sealing work.
Figure 2:
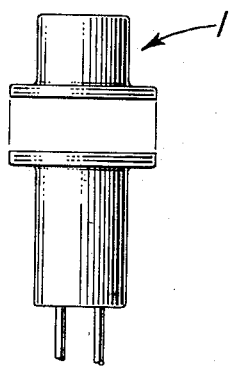
Figure 2 is an exploded view showing the two parts of the envelope which are to be sealed together.

In the device illustrated in Figure 1 of the drawing the flux distribution is taken care of by rotating the work relative to the work coil. The object to be welded is shown at 10 as a mercury switch but might readily be an electron discharge device of the same general configuration in which two metallic abutting flanges are to be welded together. The object to be welded is held in a spindle 20 which is connected to shaft 22 which is in turn driven by a motor not shown having a flexible shaft. The spindle 20 is held in bearing 14 and the entire assembly is so made as to be adapted to rise above the table 16 by pushing on shaft 17. This can be accomplished by means of a foot pedal or some similar means. To perform the sealing operation the unit is elevated into the range of the radio frequency flash coil 27 with a top of the object 10 seating on 18 in the housing 19. The seating pin 18 is backed by springs 13 and 15. When the object to be welded has been properly centered in the coil 27 and an R. F. surge sent through the coil the periphery of the flanges 11 and 12 are molten and welded together so as to make a seal which is vacuum tight. During this operation the shaft 22 rotates thereby distributing the flux equally and as uniformly as possible between the flux coil and the periphery of the flanges at the point to be sealed.

Figure 3:
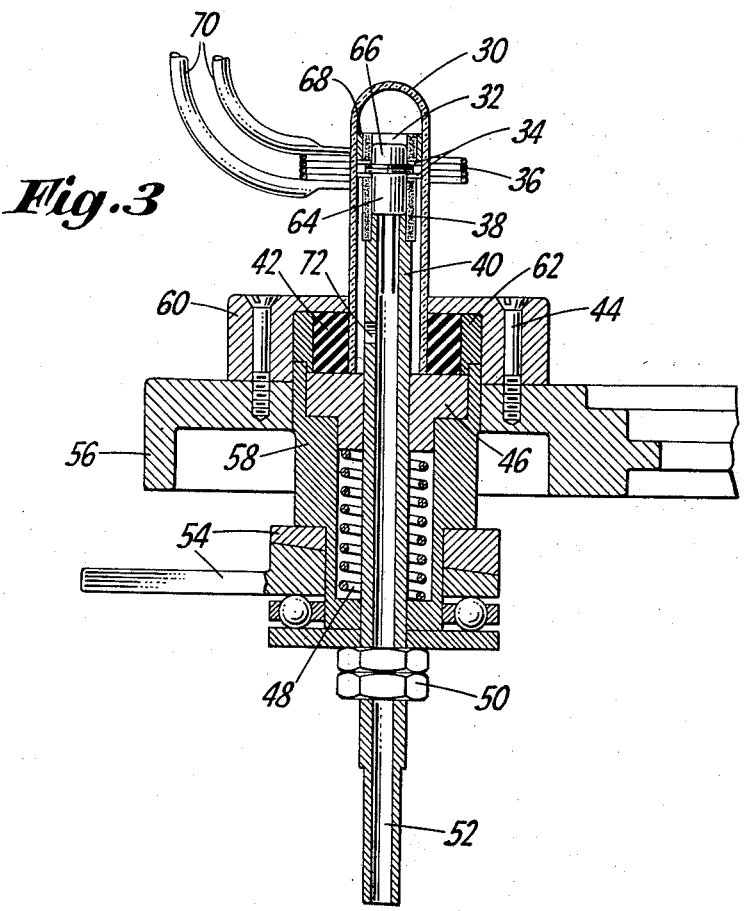
Figure 3 is a front elevation partly in section of a so-called Hoffmann flash welding port provided with means for distributing the flux evenly to the desired area.

In the apparatus illustrated in Figure 3 a high permeability core made of powdered iron has been used as the means of distributing the flux densities equally around the area in which the seal is to take place. This core has been indicated at 38 as two cylindrical parts, one positioned above the flanges 34 and 35 to be sealed and the other below but being separated therefrom by means of spacers 34. It is immediately adjacent to the sides of the can and is shielded therefrom by a copper shielding sleeve 64. In this device as there shown the essential features are a bell jar 30 in which all processing takes place; a means of forming a vacuum type system such as by means of the compression of rubber 42; a port for evacuating and controlling the atmosphere in the system such as 52 and a rigid means for supporting the work 40.

The device illustrated in Figure 3 is used primarily for the welding of components which are to be evacuated, the evacuation being carried out within the bell jar 30 which is held in vacuum tight relationship with the exhaust port 52 with the aid of port cap 16 which is fastened to the margin top 56 by means of anchor bolt 44. The actual seal is made with the aid of compression rubber 42 which snugly fits about the bell jar 30, the pressure on the bell jar through means of the compression rubber being made with the aid of the open and close lever cam 54, port loading spring 48 and port plunger 46. When the lever and cam 54 are in open position the port loading spring 48 is in uncompressed state and permits the port plunger 46 to release the pressure on the compression rubber 47 and permit the bell jar 30 to be withdrawn from the compression rubber 42 and the port cap 60. When the bell jar has been withdrawn one has ready access to the brass support 40 onto which the parts to be welded are placed, along with the copper shielding sleeve 64 the spacers 34 and the high permeability core 38. When these are in position the bell jar 30 can be slipped back over the assembled parts down into the port cap 60 and the compression rubber 42 which is in turn surrounded by a port collar 62 and a port sleeve 58. Thereupon operation of the lever and cam 54 to the closed position compresses the loading spring 48 and forces the port plunger 46 to compress the compression rubber 42 and snugly seal the rubber to the bell jar whereupon the inner space of the bell jar is in vacuum tight relationship with the exhaust port 52 through opening 72 provided in the brass support 40. When the R. F. concentrating coil 36 has then been placed into position and current supplied through the R. F. leads 70 the abutting edges of the work piece 66 are molten and sealed.

While the above description and drawing particularly as shown in Figure 3 relates to devices which are evacuated prior to sealing it is, of course, understandable that a similar apparatus might well be used to produce devices filled with a specific gas. Furthermore, it is also to be understood that while the specification and drawings have referred specifically to the R. F. range, the invention can readily be used with high frequency and ultra high frequency or other frequency at which inductive type sealing can be accomplished.

While the above description and drawing submitted herewith disclose a preferred and practical embodiment of the apparatus and method of this invention it will be understood that the specific details of construction and arrangement of parts as shown and described are by way of illustration and are not to be construed as limiting the scope of the invention.

What is claimed is:

1. In an apparatus for hermetically sealing a controlled atmosphere within the casing of an electronic device, said device having a pair of wall portions having radially extending conductive flanges in abutting relationship, the combination of an inductive field permeable casing about said device adapted to establish and maintain a controlled atmosphere about said device, an inductive heating coil about said casing and flux concentrating means within said casing and in abutting relationship with one of said flanges.

2. An apparatus for hermetically sealing a controlled atmosphere within the casing of an electronic device, said device having a pair of wall portions having radially extending conductive flanges in abutting relationship, comprising an inductive field permeable casing about said device adapted to establish and maintain a controlled atmosphere about said device, an inductive heating coil about said casing, and means within said casing for concentrating the field of said coil at said flanges, said last mentioned means including rings of high permeability material surrounding said device on each side of said flanges.

3. An apparatus for hermetically sealing a controlled atmosphere within the casing of an electronic device, said device having a pair of wall portions having radially extending conductive flanges in abutting relationship, comprising an inductive field permeable casing about said device adapted to establish and maintain a controlled atmosphere about said device, an inductive heating coil about said casing, and means within said casing for concentrating the field of said coil at said flanges, said last mentioned means including rings of high permeability material in contacting relationship with at least one of said flanges.

4. An apparatus for hermetically sealing a controlled atmosphere within the casing of an electronic device, said device having a pair of wall portions having radially extending conductive flanges in abutting relationship, comprising an inductive field permeable casing about said device adapted to establish and maintain a controlled atmosphere about said device, an inductive heating coil about said casing, and means within said casing for uniformly distributing said field around the periphery of said flanges, said last mentioned means including a number of rings of high permeability material in contacting relationship with at least one of said flanges.

5. An apparatus for hermetically sealing a controlled atmosphere within the casing of an electronic device, said device having a pair of wall portions having radially extending conductive flanges in abutting relationship, comprising an inductive field permeable casing about said device adapted to establish and maintain a controlled atmosphere about said device, an inductive heating coil about said casing, and means within said casing for concentrating the field of said coil at said flanges, said last mentioned means including a number of rings of high permeability low loss material in contacting relationship with at least one of said flanges.

6. An apparatus for hermetically sealing a controlled atmosphere within the casing of an electronic device, said device having a pair of wall portions having radially extending conductive flanges in abutting relationship, comprising an inductive field permeable casing about said device adapted to establish and maintain a controlled atmosphere about said device, an inductive heating coil about said casing, and means within said casing for uniformly distributing said field around the periphery of said flanges, said last mentioned means including a number of rings of high permeability low loss material in contacting relationship with at least one of said flanges.

References Cited in the file of this patent

UNITED STATES PATENTS

| | | |
|---|---|---|
| 1,911,046 | Wright | May 23, 1933 |
| 2,167,798 | Denneen et al. | Aug. 1, 1939 |
| 2,202,758 | Denneen et al. | May 28, 1940 |
| 2,279,854 | Whitney | Apr. 14, 1942 |
| 2,361,517 | White et al. | Oct. 31, 1944 |
| 2,490,206 | Calley | Dec. 6, 1949 |
| 2,493,771 | Marquardt et al. | Jan. 10, 1950 |
| 2,511,059 | Haynes | June 13, 1950 |
| 2,512,718 | Grumel | June 27, 1950 |
| 2,537,289 | Van Embden | Jan. 9, 1951 |
| 2,542,393 | Chapman | Feb. 20, 1951 |
| 2,625,637 | Garner et al. | Jan. 13, 1953 |
| 2,627,416 | Schoemehl et al. | Feb. 3, 1953 |